UNITED STATES PATENT OFFICE.

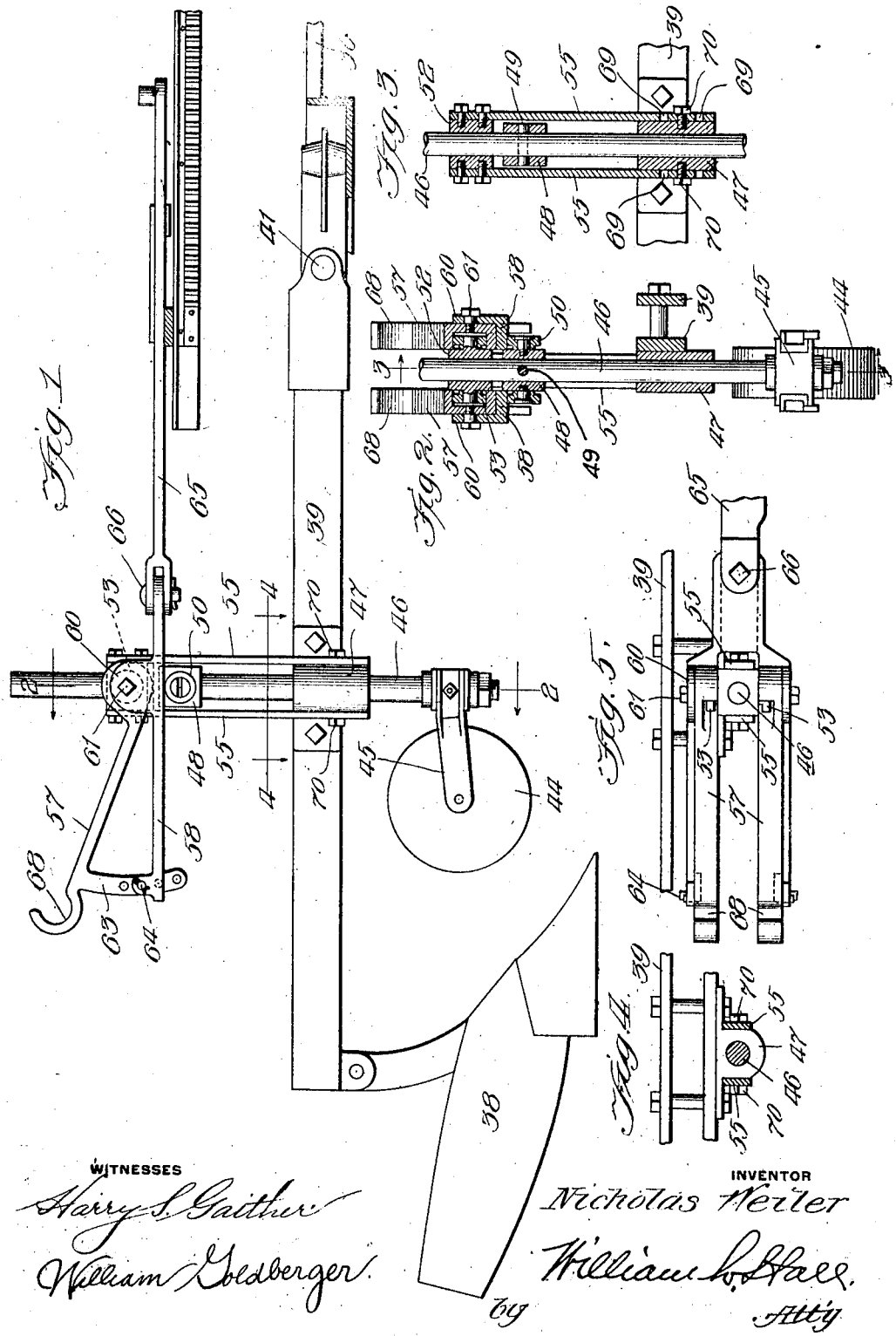

NICHOLAS WEILER, OF CANTON, ILLINOIS, ASSIGNOR OF ONE-HALF TO B. L. SHRADER, OF FORT COLLINS, COLORADO.

GAGE DEVICE FOR PLOWS.

1,019,729.      Specification of Letters Patent.      Patented Mar. 5, 1912.

Original application filed January 30, 1911, Serial No. 605,601. Divided and this application filed May 19, 1911. Serial No. 628,335.

*To all whom it may concern:*

Be it known that I, NICHOLAS WEILER, a citizen of the United States, and a resident of Canton, in the county of Fulton and State of Illinois, have invented certain new and useful Improvements in Gage Devices for Plows; and I do hereby declare that the following is a full, clear, and exact description thereof, reference being had to the accompanying drawings, and to the characters of reference marked thereon, which form a part of this specification.

This invention relates to improvements in wheeled gang plows, and refers more specifically to gage wheel lift devices for lifting the plows out of the ground and holding them in their raised positions.

My improvements are herein shown as applied to a plow of that type shown in my prior application for United States Letters Patent, Serial Number 605,601, filed January 30th, 1911, of which the present application is a division.

The invention consists in the matters hereinafter set forth and more particularly pointed out in the appended claims.

In the drawings,—Figure 1 is a side elevation, with parts in section, of one plow and its beam and the supporting or gaging wheel therefor, showing a portion of the mechanism for raising the plow out of the ground. Fig. 2 is a section on the line 2—2 of Fig. 1. Fig. 3 is a section on the line 3—3 of Fig. 2. Fig. 4 is a horizontal section on the line 4—4 of Fig. 1. Fig. 5 is a plan detail illustrating a portion of the plow beam and the raising and lowering mechanism associated therewith.

The plow gang frame, comprising in part the platform 30, shown in a fragmentary way in Fig. 1, may be supported in the manner shown in my aforesaid application. The plow 38 is attached to the beam 39 in any preferred manner and said beam is attached to the frame 30 in any suitable manner. Said beams are provided in rear of the frame 30 with a horizontal pivot 41 to permit the rear end of the beam and plow to swing vertically. In a complete gang plow, such as is shown in my aforesaid application, a number of plows and their beams are arranged side by side and connected to said frame 30. The said plow is supported and the depth of its cut gaged by a gage wheel or roller 44 arranged just in front of the plow and supported in a bracket 45 that is mounted on the lower end of a vertical post 46 which extends loosely upwardly through a bearing 47 attached to the plow beam. Said post 46 is provided at its upper end with a block 48 attached thereto by means of the pin 49 (Fig. 3), and said block is provided at its laterally opposite sides with studs carrying bearing rollers 50, 50. Sliding loosely on the post 46 above the block 48 is a sleeve 52 which is also provided with oppositely extending studs that carry bearing rollers 53, 53. The said sleeve 52 is rigidly connected by means of the straps or bars 55, 55 to the lower bearing 47. The rollers 53 of the sleeve 52 are adapted to engage the upwardly facing surfaces of oblique or inclined members 57, the forward or lowermost ends of which terminate in pockets in which the said rollers 53 normally rest, and which constitute stops to limit the rearward movement of the inclined members 57.

58, 58 designate horizontally arranged members below the oblique members 57, said members being adapted to rest on the rollers 50 of the fixed block 48. Said bars 58 are provided with upwardly extending ears 60 which overlap the outer sides of the forward ends of the oblique members 57 and are attached thereto by screw bolts 61, which screw bolts constitute a pivotal connection between the horizontal and oblique members 57 and 58. Said oblique members 57 are provided with apertured, arcuate arms 63 which overlap the rear apertured ends of the members 58 and are adapted to be locked in adjusted relation thereto by means of the pins 64. The said members 58 extend at their forward ends beyond the shafts 46 and are pivotally or otherwise joined to horizontally arranged bars 65, as by the pivot pins 66.

The upper and lower members 57 and 58, arranged as described, constitute in effect a bifurcated wedge, the upper or oblique member of which engages the rollers of the sleeve 52, and the lower or horizontal member of which engages the rollers of the block 48 whereby, when said wedge is drawn forwardly the rear end of the plow beam is lifted, through the medium of the straps 55 and bearing block 47, so as to raise the plow out of the ground; the lifting stress being resisted by the block 48 fixed to the post 46. The extent of such lifting movement which may occur during the forward travel of the wedge may be varied by adjusting the angle of the oblique members 57 to the horizontal members 58 of the wedges, as permitted by the pivotal mounting of the oblique members and the adjusting pins 64. The said oblique members of the wedges are formed at their rear ends with notches or sockets 68 into which the bearing rollers 53 pass and by which they are held when the wedge is in its forwardmost position so as to thereby lock the plow in its raised or lifted position.

The depth to which the plow may be set into the ground may be regulated by providing the lower ends of the straps 55 with a series of apertures 69 to receive the screw bolts 70 by which they are attached to the lower bearing 47, as most clearly shown in Fig. 3. When the wedge actuating bar 65 is drawn forwardly the wedge constituted by the members 57 and 58 acts on the rollers 53 and 50 to exert a depressing action on the gage wheel 44 whereby, through reaction thereon, the plow beam and plow are raised so that the plow will leave the ground; and when the upper rollers reach the recesses 68 of the wedges the plow will be locked in its raised position until the bar 65 is forced rearwardly.

The wedge actuating bar 65 may be reciprocated forwardly to raise the plow, and rearwardly to permit the plow to be lowered, in any suitable manner, as, for instance, by the rack and pinion mechanism shown in my aforesaid application, or otherwise.

I claim as my invention:

1. A wheeled gang plow comprising a frame, a plow having a forwardly extending, vertically swinging beam connected with the frame, a wedge device for raising and lowering the plow, a bar extending forwardly from said wedge device and positively actuated means connected with the forward end of said bar for shifting the latter forwardly and rearwardly.

2. In a gang plow, a frame, a plow having a forwardly extending, vertically swinging beam connected to the frame, a vertical post extending loosely through a bearing carried by the plow end of said beam and provided at its lower end with a wheel to travel on the unplowed ground, vertically separated bearing elements carried by the beam and said post, a wedge device movable between said bearing elements and means for giving forward and rearward movement to the wedge device.

3. In a gang plow, a frame, a plow having a forwardly extending, vertically swinging beam connected to the frame, a vertical post extending loosely through a bearing carried by the plow end of said beam and provided with a gage wheel, members extending upwardly from the beam and having a sleeve through which the post loosely extends, a block fixed to the post below said sleeve, a forwardly and rearwardly moving wedge device movable between the sleeve and block and means for giving movement to the wedge device.

4. In a gang plow, a frame, a plow having a forwardly extending, vertically swinging beam connected to the frame, a vertical post extending loosely through a bearing carried by the plow end of said beam and provided at its lower end with a gage wheel, vertically separated bearing elements carried by the beam and said post, a wedge device movable between said bearing elements and means for giving positive forward and rearward movement to the wedge device, said wedge device comprising a horizontal member and an oblique member, with means for adjusting the inclination of the oblique member to the horizontal member.

5. In a gang plow, a frame, a plow having a forwardly extending, vertically swinging beam connected to the frame, a vertical post extending loosely through a bearing carried by the plow end of said beam and provided at its lower end with a gage wheel, vertically separated bearing rollers carried by said post and said beam, and a forwardly and rearwardly movable wedge device movable between said bearing rollers, said wedge device being provided at one limit of the movement thereof with recesses or sockets to receive the bearing rollers at one side thereof to lock the plows in their raised positions.

6. The combination with a vertically swinging beam carrying at one end a plow and provided near the plow with a vertical bearing, a post extending loosely through said bearing and provided at its lower end with a wheel to travel on the unplowed ground, upper and lower bearing elements carried by the beam and post, respectively, a wedge device movable between said bearing elements for raising and lowering the plow end of the beam and means for giving positive to and fro movement to the wedge device.

7. The combination with a vertically swinging beam carrying at one end a plow and provided near the plow with a vertical bearing, a post extending loosely through said bearing and provided at its lower end with a gage wheel, upper and lower bearing elements carried by the beam and post, respectively, a wedge device movable between said bearing elements for raising and lowering the plow end of the beam and means for giving positive to and fro movement to the wedge device, said wedge device comprising a lower horizontal member and an upper oblique member pivoted thereto, with means for adjusting the inclination of the pivotal to the horizontal member.

In testimony, that I claim the foregoing as my invention I affix my signature in the presence of two witnesses, this fifteenth day of May A. D. 1911.

NICHOLAS WEILER.

Witnesses:
H. E. McCarney,
H. R. Johnson.